United States Patent [19]

Ott

[11] Patent Number: 4,692,859
[45] Date of Patent: Sep. 8, 1987

[54] MULTIPLE BYTE SERIAL DATA TRANSFER PROTOCOL

[75] Inventor: Russell G. Ott, Cranford, N.J.

[73] Assignee: RCA Corporation, Somerville, N.J.

[21] Appl. No.: 495,115

[22] Filed: May 16, 1983

[51] Int. Cl.⁴ .................. G06F 15/00; G06F 12/06
[52] U.S. Cl. ........................... 364/200; 340/825.65; 377/44; 377/54
[58] Field of Search ... 364/200 MS File, 900 MS File; 360/40, 48, 49; 340/825.69, 835.65; 179/2 DP; 377/44, 54

[56] References Cited

U.S. PATENT DOCUMENTS

| | | | |
|---|---|---|---|
| 4,117,263 | 9/1978 | Yeh | 364/200 X |
| 4,138,732 | 2/1979 | Suzuki et al. | 364/900 |
| 4,168,469 | 9/1979 | Parikh et al. | 364/900 |
| 4,244,032 | 1/1981 | Oliver | 364/900 |
| 4,249,172 | 2/1981 | Watkins et al. | 364/900 X |
| 4,249,248 | 2/1981 | Yomogida et al. | 364/900 |
| 4,270,181 | 5/1981 | Tanakura et al. | 364/200 X |
| 4,286,320 | 8/1981 | Ott | 364/200 |
| 4,367,479 | 1/1983 | Jenkins | 360/48 |
| 4,369,516 | 1/1983 | Byrns | 360/48 X |
| 4,408,272 | 10/1983 | Walters | 364/200 |
| 4,408,276 | 10/1983 | Nishibe | 364/200 |
| 4,456,933 | 1/1984 | Schneider et al. | 360/49 |
| 4,473,879 | 9/1984 | Tachiuchi et al. | 364/200 |
| 4,482,951 | 11/1984 | Swaney et al. | 364/200 |

FOREIGN PATENT DOCUMENTS 13853 6/1980 European Pat. Off. .
1110994 4/1968 United Kingdom .
2073995A 10/1981 United Kingdom .

OTHER PUBLICATIONS

"Mikroprozessoren und Mikrocomputer", Werner Diehl, pp. 66-67, 91; 1977.
"PMA-Controller 8237 von Intel", Microextrra, pp. 6-13, Mar. 1982; von Pipl. Ing. (FH) Jurgen Harwardt.

Primary Examiner—Archie E. Williams, Jr.
Assistant Examiner—Thomas C. Lee
Attorney, Agent, or Firm—Henry I. Schanzer; Birgit E. Morris; Stanley C. Corwin

[57] ABSTRACT

In a data processor system, a method for transferring data to and from a random access memory (RAM) with a serial data interface and having accessible word location includes the steps of generating a timing pulse consisting of contiguous time slots each defined by the Nth count of a counter, generating an initial address signal in the first occurring contiguous time slot of the timing pulse with the initial address signal including a read-/write command signal, incrementing the initial address signal at each Nth count of the counter to form data address signal, accessing memory locations in the RAM with the initial address signal followed by said data address signals, supplying data words to or reading data words from the RAM at the word locations accessed by the data address signals in response to each Nth count of the counter and when the data address signal contains a write command or a read command signal, respectively.

3 Claims, 4 Drawing Figures

MULTIPLE BYTE SERIAL DATA TRANSFER PROTOCOL

This invention relates generally to the bi-directional transfer of data between a memory and a central processing unit (CPU) and more particularly to a method of transferring data which substantially increases the speed of multiple byte serial data transfers.

BACKGROUND OF THE INVENTION

In the prior art the transfer of each byte of data is usually preceded by an address. Thus, alternate addresses and data transfers are required with one address for each data transfer.

SUMMARY OF THE INVENTION

In the present invention a single address byte is generated and supplied to memory from the processing unit and is followed by a plurality of data transfers to or from the memory without the need for further generation of addresses by the processing unit.

In accordance with a preferred form of the invention there is provided, in a data processor system, an improved method of transferring data to and from a random access memory having accessible word locations and comprising the steps of generating a timing pulse consisting of contiguous time slots each defined by the Nth count of a counter, generating an initial address signal in the first occurring contiguous time slot of the timing pulse with the initial address signal including a read/write command signal, incrementing the initial address signal at each Nth count of the counter to form data address signals, accessing memory locations in the RAM with the address signals, supplying a data word to the RAM at the word location accessed by the address signal in response to each Nth count of the counter when the address signal concurrently contains a write command signal, and, reading a data word from the RAM in response to each Nth count of the counter when the address signal concurrently contains a read command.

DETAILED DESCRIPTION

Figure 2:
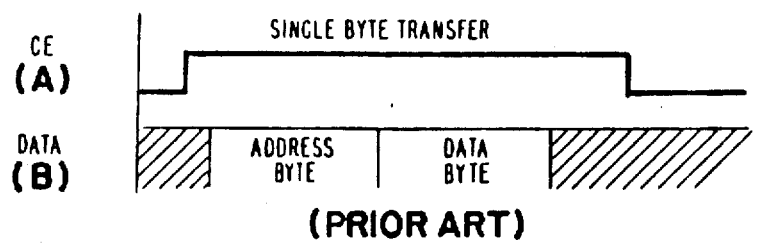
FIG. 2 shows timing waveforms of the relationship between address and data bytes of prior art data transfer techniques.

In the following description, for purposes of brevity, the timing waveforms of FIGS. 2, 3 and 4 will be referred to as waveform 2A or waveform 3B rather than as waveform A of FIG. 2 or waveform B or FIG. 3.

Figure 1:
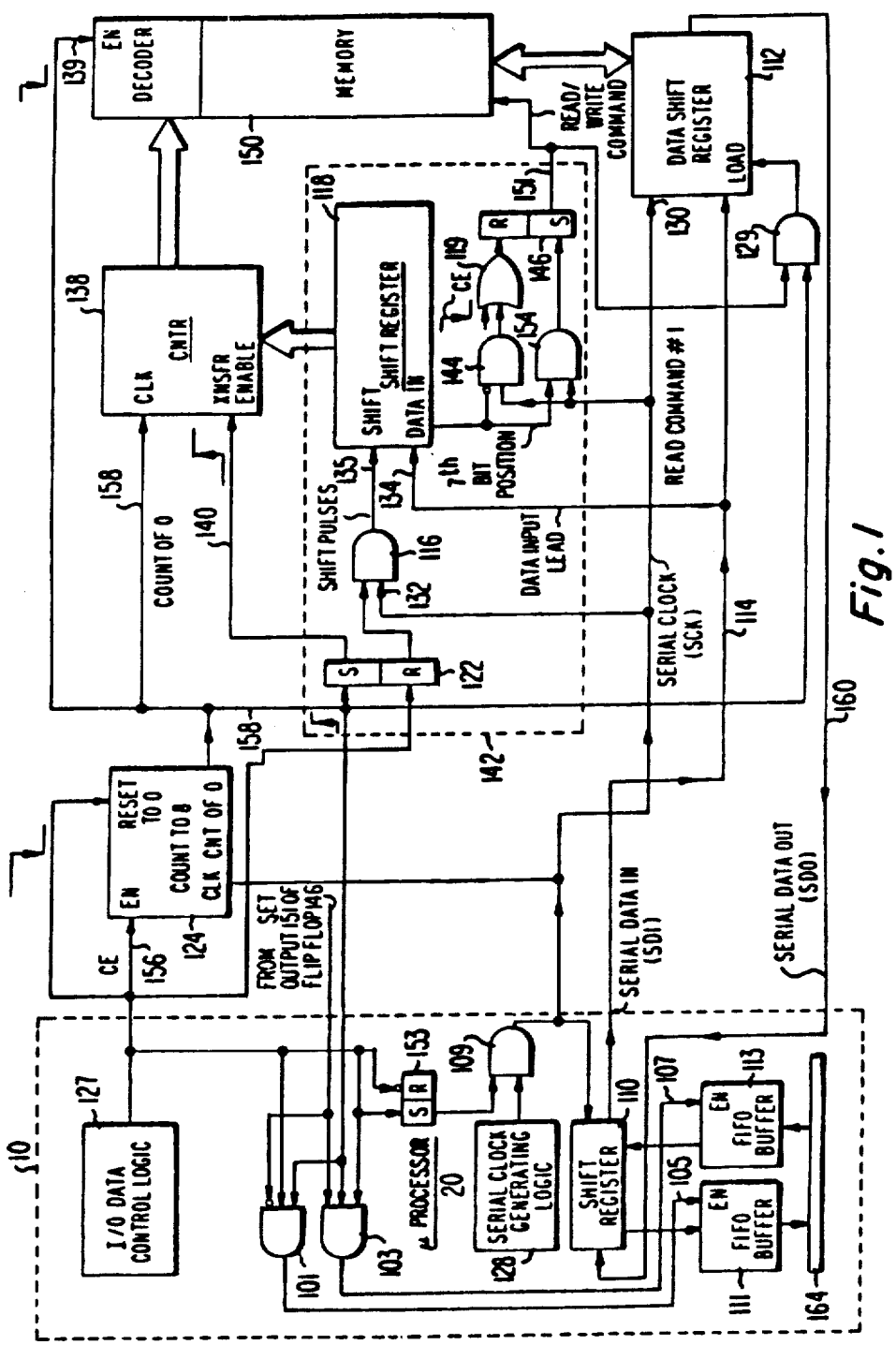
FIG. 1 shows a block diagram of the invention.
Figure 3:
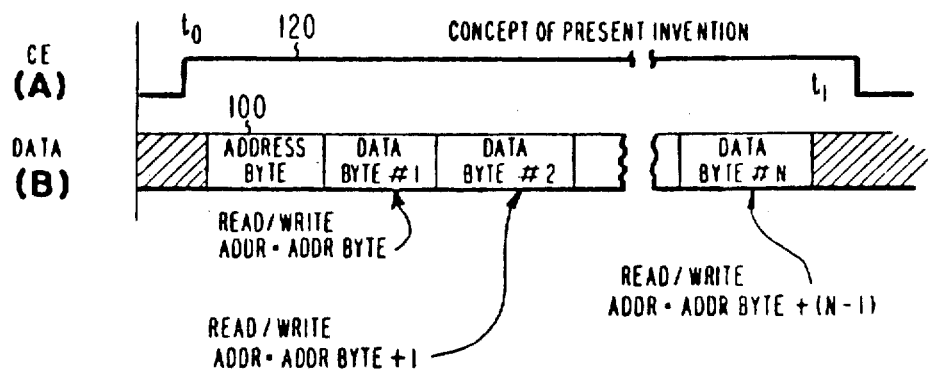
FIG. 3 shows timing waveforms of the relationship between address and data bytes of the present invention.

Referring now to FIGS. 1 and 3, the bits forming the address byte 100 of waveform 3B followed by the data bytes # 1 to # N are supplied serially from data bus 164 to FIFO buffer 113, then to shift register 110, and then to data shift register 112 via lead 114. Bus 164, buffer 113, shift register 110 and other elements inside dashed box 10 are all elements of a microprocessor 20. Such train of bits is also supplied to the input of shift register 118.

Just prior to the transmission of the address byte 100 of waveform 3B at time $t_0$ a count enable (CE) pulse 120 (waveform 3A) will go to its high level under control of I/O data control logic 127 (FIG. 1) thereby resetting flip-flop 122 and also enabling counter 124. Counter 124 is clocked by a serial train of clock pulses generated in serial clock generating logic 128 and supplied thereto through AND gate 109 when primed by the high level CE pulse 120 from I/O control logic 127. Such train of clock pulses is also supplied through AND gate 109 to input 130 of data shift register 112 and to input 132 of AND gate 116.

Since AND gate 116 is now primed by the reset condition of flip-flop 122, the clock pulses from clock source 128 will pass through AND gate 116 to shift input 135 of shift register 118 and will shift thereinto the data being supplied to the data input terminal 134 from shift register 110 via lead 114. At the end of 8 clock pulses, the counter 124 will return to its count of 0 state to set flip-flop 122 thereby disabling AND gate 116 to cut off the shift pulses and thus prevent further data bits from being entered into shift register 118. Thus, the count of shift register 118 will contain only the first received byte (8 bits), which is the address byte. This address byte is entered into counter 138 when enabled via lead 140 upon the setting of flip-flop 122 and will access in the memory 150 the memory location defined by such address byte now in counter 138.

The contents of the 7th bit position of the shift register 118, which is the last bit of the address byte 100 of waveform 3B, determines whether the operation will be a read or write operation. If such 7th bit position contains a binary O then AND gate 144 will be energized to reset flip-flop 146 and thereby cause a read operation from memory 150 (manifested by a 0 on lead 151). On the other hand, if the 7th bit position of shift register 118 contains a binary 1, AND gate 154 will be enabled to set flip-flop 146, thereby sending a write command to memory 150. This read or write command will continue for the entire group of data bytes of waveform 3B and until the next address byte is received with a new read/write command.

Upon the complete reception of the address byte 100 of waveform 3B the logic within the dotted block 142 of FIG. 1 will become inactive until the next address byte (not shown in waveform 3B) is received. However, as discussed above, the data bytes received after the reception of address byte 100 will be supplied serially to data shift register 112 from shift register 110 under control of the clock output of clock source 128 and without further address bytes being generated. The counter 124 will respond to these clock pulses from clock source 128 since it is still enabled by the CE pulse on lead 156 to cycle through its 8 count capacity every 8 clock pulses and to supply a count of 0 output pulse to output lead 158 every 8 clock pulses. Such count 0 output pulse will increment counter 138 by 1 to cause the next memory location in memory 150 to be accessed.

At the end of data byte N of waveform 3B the CE pulse 120 of waveform 3A will return to its low level at time $t_1$ thereby disabling counter 124 which in turn will terminate the incrementing of counter 138 so that no further memory locations in memory 150 are accessed.

In the case of the read-out of data from memory 150 the logic within dotted block 142 functions in the same manner as in the case of a write in function in response to the address byte, such as address byte 100, except that the command to memory 150 is now a read command rather than a write command. Thus, on each count of 0 of counter 124 the data shift register 112 functions to receive data from memory 150 under control of the load signal which is the trailing edge of the count of 0 of counter 124.

The data written into shift register 112 is read therefrom and back to shift register 110 via serial data readout lead 160 from whence it can be read into a buffer register 111 and then onto data bus 164 by well known means.

Consider now AND gates 101 and 103 which function to enable either FIFO 111 or FIFO 113, respectively, in accordance with whether data is being read from memory 150 or being written thereto. AND gates 101 and 103 respond to the concurrence of the CE signal outputted from I/O data control logic 127 and shown in waveform 3A, the count 0 of counter 124 on lead 158, and the set output of flip-flop 146 (inverted at the input to AND gate 101) to enable either the FIFO buffer 111 or the FIFO buffer 113, respectively. The foregoing provides synchronization of the count 0 of counter 124 with the data bytes which are read into data shift register 112 from shift register 110 or alternatively read out of data shift register 112 into data shift register 110.

More specifically, a word will not be read into shift register 110 from FIFO buffer 113 until a count of 0 of counter 124 occurs. Nor will a word be read from shift register 110 into FIFO buffer 111 until a count of 0 of counter 124 occurs.

In summary the data shift register 112 will be loaded with a data word from memory 150 only upon the concurrence of the count of 0 of counter 124 and a read command, both of which signals must be supplied to the two inputs of AND gate 129. Upon enablement of AND gate 129 the data shift register 112 will then load a word from memory 150 during the read out operation. On the other hand, a data word being read into memory 150 from data shift register 112 will not do so until the occurrence of the trailing edge of a count of 0 of counter 124 which is supplied to enable input 139 of memory 150. Since a data word becomes completely entered into the data shift register 112 upon the count of 0 of counter 124 it follows that the writing of such word into memory 150 can also occur upon the occurrence of the trailing edge of the count 0 of counter 124.

The output of serial clock generator 128 is supplied to data shift register 118, counter 124 and to data shift register 112 only after flip-flop 153 has been set by the positive-going leading edge of the CE pulse from I/O control logic 127. Simultaneously with the positive-going leading edge of the CE signal, the FIFO 113 is enabled by the output of AND gate 103 to supply the first word, which is the 8 bit address byte, to shift register 110 which then supplies such address byte serially to data input terminal 134 of shift register 118 in the manner described above.

At the end of the transfer of the data following the address byte to or from memory 150 the negative-going trailing edge of the CE pulse from I/O data control logic 127 functions to reset flip-flop 153, thereby blocking the output of serial clock generator logic 128 from the system and also resetting flip-flop 146 through or gate 119 in preparation for the reception of the next CE pulse.

More specifically, the resetting of flip-flop 146 leaves AND gate 103 primed so that the occurrence of the next CE pulse AND gate 103 will become conductive to enable FIFO buffer 113 and thereby supply the first byte of the next transaction to shift register 110 and then serially via lead 114 to shift register 118 in the manner described above.

Figure 4:
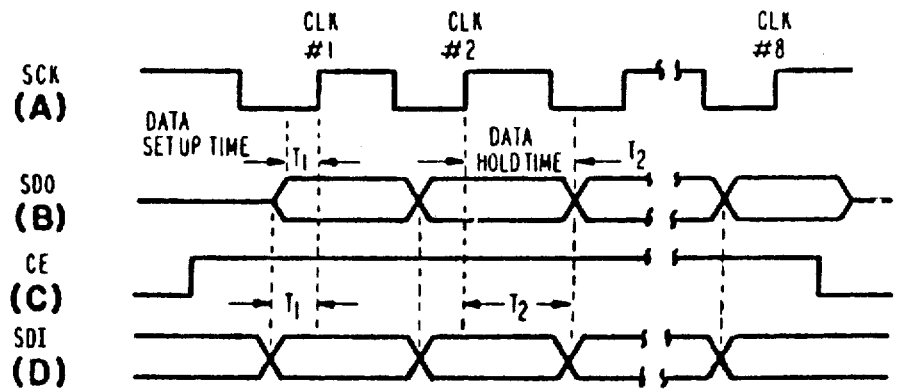
FIG. 4 shows other timing waveforms of the present invention.

FIG. 4 shows the relation of the various timing signals SCK, SDO, CE and SDI indicated in FIG. 1. It will be noted that the leading (positive-going) edges of the clock pulses, designated as clock pulses #1, #2, and #8, occur a period of time $T_1$ after data is present on the SDI lead 114 of FIG. 1, as shown in waveform 4D. Such period of time permits the data to become settled on the line before being clocked into data shift register 112 or into counter register 118 by the clock pulses of waveform 4A. For the same reason, the data is held on the bus 114 a certain amount of time $T_2$ after it is clocked into shift registers 112 and 118.

What is claimed is:

1. In a data processing system comprising a central processing unit (CPU), a random access memory (RAM) having a memory address terminal for receiving memory address signals and having a data terminal into which and out of which pass data signals, first means coupled between said CPU and RAM for bit serially transferring data ordered in bytes between said CPU and RAM data terminal and for transferring said memory address signal as a byte to said RAM memory address terminal and a clock pulse generating means producing time spaced pulses synchronized with the transfer of data, the improvement in said first means for the control of message signal transfer between said CPU and RAM, where the message signal comprises a single RAM address byte followed in succession by a plurality of data bytes, comprising in combination:

second means coupled to receive clock pulses from said clock pulse generating means and in response thereto producing a pulse marking the termination of each of said bytes (data or address) transferred in said first means;

third means having a terminal for receiving said RAM address byte thereat to be stored therein and coupled to said RAM address terminal to pass address signals thereto; and fourth means responsive to a first of said pulses from said second means and coupled to said first means for transferring said address byte of said message to said third means terminal;

said third means being coupled to said second means for receiving said pulses therefrom and, response to each pulse, incrementing the value of RAM address byte stored therein in correspondance with the transfer of succeeding data bytes whereby said RAM is addressed to said address byte of said message and responsive to subsequent ones of said pulses for passing said data bytes serially between said CPU and RAM.

2. A data processing system as in claim 1 wherein said single address byte includes a signal portion indicative of whether said data bytes are to be written into RAM or read from RAM and further comprising, in said first means:

data handling means including shift register means responsive to said signal portion indicating a read command and to said pulse from said second means to store said data words read from said RAM;

said data handling means further responsive to said signal portion indicating a write command and to said pulse from said second means to supply data words to said data terminal of said RAM.

3. A data storage and retrieval circuit (DSR) for operation with a microprocessor that has a single data output terminal for receiving information in bit serial form from said DSR, a single data input terminal for transmitting information in bit serial form to said DSR, a clock terminal for producing pulses corresponding to the transfer of each bit of information between said DSR and microprocessor and a circuit enable terminal for producing a circuit enable signal marking the time period during which information is being transferred between said microprocessor and said DSR, said information being in the form of an information signal representing a memory address byte transmitted from said microprocessor to said DSR via said data input terminal, said address byte including a read-write portion determinative of whether said data is to be transmitted from said DSR to said microprocessor or from said microprocessor to said DSR followed by a plurality of data bytes transmitted to or from said DSR via said input terminal or via said output terminal depending on the value of said portion of said address byte, said DSR comprising in combination:

an addressable memory having a data terminal into which and out of which can pass data bytes to be written into memory or read out of memory in bit parallel form and an address terminal for receiving signals determinative of where in memory said data is to be written in or read out;

means responsive to said circuit enable signal and to said clock signal for producing pulses marking the boundaries in said information between said address byte and first data byte and between successive data bytes;

means responsive to said circuit enable signal and to said clock pulses for accepting and storing said memory address byte of said information signal including said read-write portion;

means responsive to said stored address, to said read-write portion and to each pulse marking the boundary between successive data bytes in said information signal to write successive data bytes into successive addresses of said memory determined by said address byte or read successive data bytes at successive locations in said memory depending on the value of said read-write portion; and means connected to said data in terminal, said data out terminal and said memory to convert the data between bit serial and bit parallel form.

* * * * *

UNITED STATES PATENT AND TRADEMARK OFFICE
CERTIFICATE OF CORRECTION

PATENT NO. : 4,692,859

DATED : Sep. 8, 1987

INVENTOR(S) : Russell G. Ott

It is certified that error appears in the above-identified patent and that said Letters Patent is hereby corrected as shown below:

Col. 1, line 59, delete "or" (second occurrence) and insert --of--.

Col. 2, line 56, after "count" insert --of--.

Col. 4, line 48 (Claim 1) after "and," insert --in--.

Signed and Sealed this

Twenty-fourth Day of May, 1988

Attest:

DONALD J. QUIGG

*Attesting Officer*     *Commissioner of Patents and Trademarks*